United States Patent

[11] 3,600,567

[72] Inventor Veijo V. Varnela
San Gabriel, Calif.
[21] Appl. No. 807,838
[22] Filed Mar. 17, 1969
[45] Patented Aug. 17, 1971
[73] Assignee Angstrom, Ind.
Chicago, Ill.

[54] METHOD AND APPARATUS FOR ANALOG COMPUTATION OF CONCENTRATIONS
17 Claims, 2 Drawing Figs.

[52] U.S. Cl. ................................................... 235/196,
235/151.12, 235/151.35
[51] Int. Cl. ................................................... G06q 7/16
[50] Field of Search .......................................... 235/196,
195, 194, 193, 197, 151.12, 151.3, 151.35, 151.13

[56] References Cited
UNITED STATES PATENTS

| | | | |
|---|---|---|---|
| 3,005,911 | 10/1961 | Burhans | 235/151.35 X |
| 3,108,929 | 10/1963 | Tolin et al. | 235/151.35 X |
| 3,119,995 | 1/1964 | Burk et al. | 235/151.35 UX |
| 3,224,947 | 12/1965 | Lupfer | 235/151.12 UX |
| 3,245,305 | 4/1966 | Turner | 235/151.35 UX |
| 3,428,796 | 2/1969 | Martens et al. | 235/151.35 X |

Primary Examiner—Malcolm A. Morrison
Assistant Examiner—Joseph F. Ruggiero
Attorney—Christie, Parker & Hale ABSTRACT: An analog method and apparatus for automatically determining the concentration of elements in a material subjected to spectrochemical analysis, from electrical signals representing ratios of the concentrations of each of the elements to a particular element. The concentration ratio signals are applied to respective storage devices. The storage devices are momentarily interconnected to generate a summation signal representing the sum of the stored ratio signals and the summation signal is applied as a divisor to a division circuit. The stored concentration ratio signals are sequentially applied as dividends to the division circuit which produces output signals respectively representing the concentrations of the various elements in the material.

Veijo V. Varnela,
INVENTOR.

Veijo V. Varnela,
INVENTOR.

METHOD AND APPARATUS FOR ANALOG COMPUTATION OF CONCENTRATIONS

FIELD OF THE INVENTION

This invention relates to spectrometers, and more particularly to an analog method and apparatus for automatically determining the concentrations of elements in a material subjected to spectrochemical analysis, from electrical signals representing ratios of the concentrations of each of the elements to a particular one of the elements.

INTRODUCTION

A typical chemical analysis of a material by spectral techniques involves an evaluation of a radiation spectrum which characterizes the material composition. The presence of a spectral component characteristic of a particular element indicates the presence of that element within the material, and the relative intensities of the radiant energy in the spectral components are related to the concentrations of the indicated elements.

In emission spectroscopy, for example, the radiant energy of each spectral component is received by a respective photoelectric transducer such as a photomultiplier tube, which generates an electrical signal proportional to the intensity of the received energy. Because the intensity of the emitted radiation can fluctuate during excitation, it has been found desirable to integrate the electrical signals from the photomultipliers over a period of time known as an "integration period." Signal integration is generally accomplished by applying each of the photomultiplier current outputs to respective integrator means such as capacitors, and charging the capacitors during the integration period.

In order to compensate for compositional and structural variations in the material under analysis, and for instrument variations which simultaneously affect the intensities of all spectral components (e.g. excitation variations), the integrated intensities of each of the spectral components corresponding to the various elements are normally compared with an integrated intensity selected as a reference. When the reference intensity corresponds to a particular spectral component (hereinafter called a "reference component"), the reference element corresponding thereto is frequently referred to as an "internal standard."

The intensity comparisons are advantageously performed by processing the voltages appearing across the integrator capacitors by suitable division means, producing electrical signals representing the ratios of the intensities of the various element components to the reference component. Predetermined calibration curves relate concentration ratios (i.e. quantities representing the ratios of the concentration of respective elements to the concentration of the reference element) to the measured intensity ratios. This calibration or linearization of the intensity-ratio signals is necessary due to well-known reversal phenomena which occur when the elements being studied are present in relatively high concentrations.

In analyses where the reference element is added to the material in a predetermined amount, or is present in relatively constant amounts over the range of materials to be analyzed (e.g. iron in the carbon steels), the concentration of the reference element may be included as a proportionality constant in each of the calibration curves. In these situations, the element concentrations can be determined directly from the calibration curve and the intensity ratios.

Where the concentration of the reference element varies significantly among the materials to be analyzed (e.g. the concentration of iron in steels ranging from the carbon steels through the high alloy steels such as the stainless steels), however, the reference element concentration cannot be conveniently included in the calibration curves. The concentrations of each of the elements (including the reference element) must therefore be calculated from the measured concentration ratios.

Since the sum of the concentrations of all elements in the material is unity, the sum of their concentration ratios is equal to the reciprocal of the reference element concentration, i.e., $$\sum_{i=1}^{n} \frac{C_i}{C_r} = \frac{1}{C_r} \quad (1)$$

where $C_i$ is the concentration of an $i^{th}$ element of a total of $n$ in the material, including the reference element $r$, and $C_r$ is the concentration of the reference element. Since further, the concentration of each element is equal to its concentration ratio divided by the reciprocal of the reference element concentration, it follows that $$C_i = \frac{\frac{C_i}{C_r}}{\sum_{i=1}^{n} \frac{C_i}{C_r}} \quad (2)$$

The concentration of any element (including the reference element) can therefore be determined by first, computing the sum of the concentration ratios for all of the elements, and second, dividing each element's concentration ratio (including the ratio of the reference element's concentration to itself) by the computed sum.

PRIOR ART

These computations have, the the past, been performed either manually (including the use of a desk calculator), or automatically through utilization of a digital computer. Manual computation, besides being subjected to data handling errors, is a relatively slow process. Computation by digital computer, although accurate and rapid, represents expensive solutions to simple mathematical problems.

SUMMARY OF THE INVENTION

The present invention discloses a method and apparatus for automatically performing the above calculations, without the use of a digital computer. The apparatus includes a plurality of signal storage devices, for individually storing the concentration ratio signals generated by the spectrometer. The storage devices are then momentarily interconnected to generate a summation signal representing the sum of the significant concentration ratio signals, and this summation signal is applied as a divisor to a division circuit. The stored concentration ratio signals are thereupon sequentially applied as dividends to the division circuit, to produce output signals respectively representing quotients of the individual concentration ratio signals to the summation signal. The generated output signals represent the concentrations of the various elements in the material.

In a preferred embodiment of the invention, the apparatus includes a plurality of storage capacitors and associated switching means, and the method makes use of the division circuit supplied by the spectrometer and which normally produces the intensity ratio signals from the integrator capacitors.

As the intensity ratios are generated by the spectrometer's division circuit, and modified in accordance with suitable calibration apparatus to represent the concentration ratios, they are applied to the respective storage capacitors. After being charged to levels representing the concentration ratios of all of the elements, the storage capacitors are connected in series for generating the summation signal, which is applied as a divisor to the spectrometer's division circuit.

The storage capacitors are thereupon disconnected from one another, and their stored signals are sequentially applied as dividends to the spectrometer's division circuit to produce output signals representing the concentration of the various elements in the material.

The output signals can be applied to suitable indicator means for producing visible indications of the element concentrations. If desired, the output signals can be applied to an analog-to-digital converter for producing digital representations of the element concentrations which, in turn, can be applied to a digital printer.

DESCRIPTION OF THE DRAWINGS

The novel features which are believed to be characteristic of the invention, together with further advantages thereof, will be better understood from the following description considered in connection with the accompanying drawings in which the method and a preferred embodiment of apparatus according to the invention are illustrated by way of example. It is to be expressly understood, however, that the drawings are for the purpose of illustration and description only, and are not intended as a definition of the limits of the invention.

Figure 1:
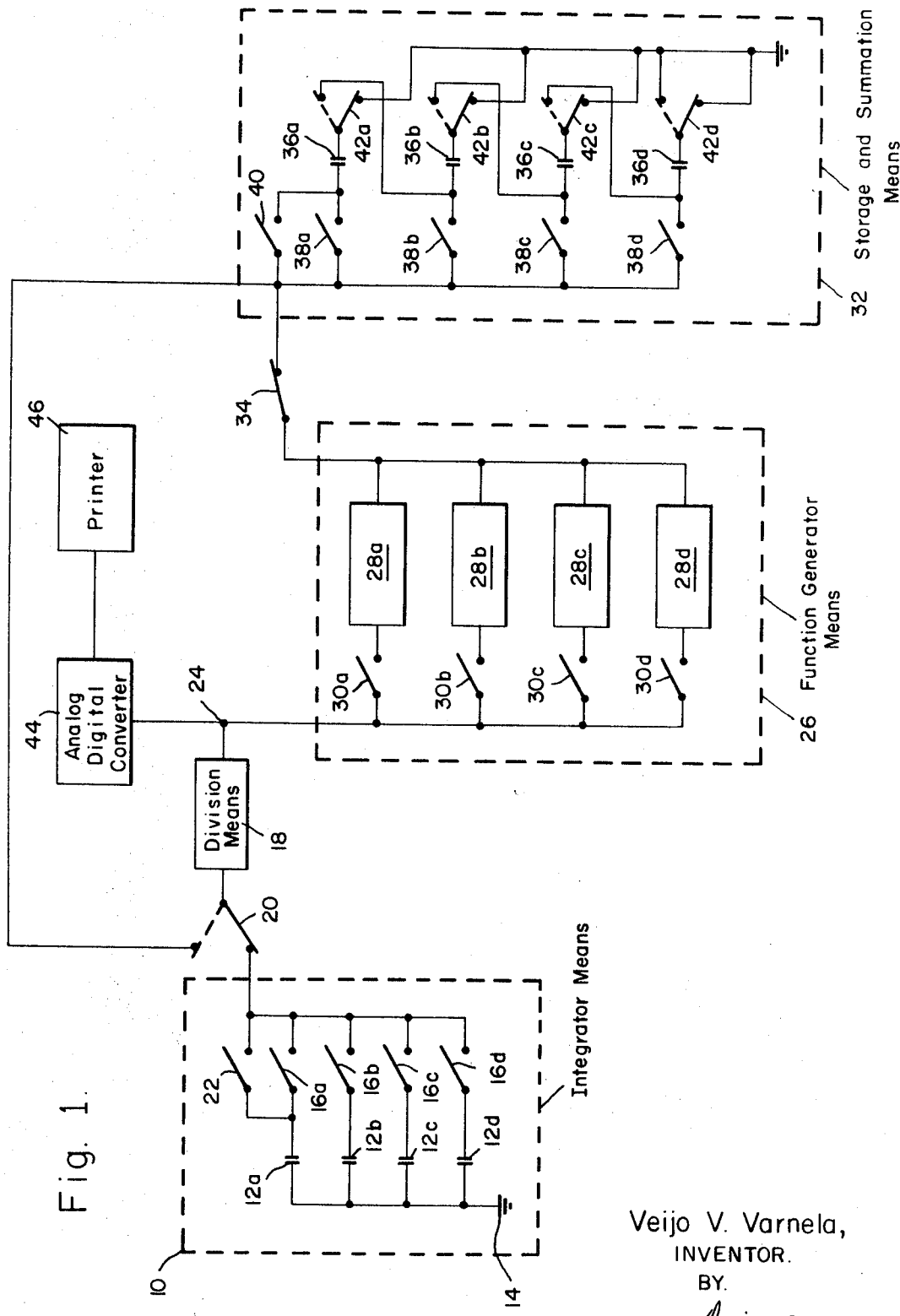
FIG. 1 is a part circuit, part block diagram of a preferred embodiment of apparatus according to the present invention.

Turning first to FIG. 1, the apparatus of the preferred embodiment is shown in combination with photocurrent integrator means 10 of an optical spectrometer. The integrator means 10 includes a plurality of integrator capacitors, such as a first integrator capacitor 12a, a second integrator capacitor 12b, a third integrator capacitor 12c, and a fourth integrator capacitor 12d (collectively referred to as integrator capacitors 12). Although four integrator capacitors 12 are shown in FIG. 1, it should be emphasized that additional capacitors may be included in the plurality.

The integrator capacitors 12 are charged by respective photoelectric transducers (not shown) which translate the various components of radiation characteristic of the material being analyzed into corresponding photocurrents, by methods well known in the spectrochemical art. For the purposes of this disclosure, it will be assumed that the integrator capacitors 12 have been respectively charged during a common integration period to levels representing the integrated intensities of the spectral components corresponding to the significant elements and other elements of interest in the material. Accordingly, one side of each of the capacitors 12 is connected to a common potential such as ground, indicated by a conventional ground symbol 14.

It will further be assumed that the photocurrent integrated by the first integrator capacitor 12a corresponds to the intensity of the reference spectral component.

A plurality of integrator switches (including first, second, third and fourth integrator switches 16a, 16b, 16c, 16d, respectively, collectively referred to as integrator switches 16) is provided for sequentially applying the voltages across the integrator capacitors 12 to a division means 18, through a double-throw switch 20 having a first alternative configuration connecting the integrator means 10 to the division means 18.

The division means 18 should be capable of providing output voltages which are linear representations of the ratios of the respective voltages across the integrator capacitors 12 to the reference integrator capacitor 12a, and suitable division means 18 are well known to the spectrochemical art. Although division circuits can be utilized which require continuous application of the reference integrator capacitor voltage as a divisor, the division circuit 18 indicated in FIG. 1 is of the type which is "set" by application of the reference voltage. After setting, each of the integrator capacitor voltages are sequentially applied to the division circuit 18 as dividends, to produce intensity ratio voltages at an output terminal 24. One appropriate division circuit, preferred because of its high speed and accuracy, is disclosed in the copending patent application of the present applicant, Ser. No. 771,721, assigned to the present assignee.

For convenience, an auxiliary reference integrator switch 22 is provided, for applying the reference intensity voltage as a divisor to the division circuit 18, and the other integrator switches 16 are thereafter sequentially operated for applying each of the integrator capacitor voltages as dividends to the division circuit 18. Obviously, the auxiliary switch 22 is not required, since the reference integrator switch 16a can be operated first to apply the reference integrator voltage as a divisor, and again to apply the reference integrator voltage as a dividend.

In performing the automatic computations disclosed herein, the magnitudes of the sequentially produced intensity ratio signals must be modified in accordance with appropriate calibration functions, to produce voltage signals representing linear functions of the concentration ratios of the type $$(V_{CR})_i = K(C_i/C_r), \quad (3)$$

where $(V_{CR})_i$ is the concentration ratio voltage corresponding to an $i^{th}$ element, and $K$ is a constant having the dimension volts, and is identical for all elements.

Function generator means 26 is provided for this purpose, and includes a plurality of function generators 28a, 28b, 28c, 28d (each of which is calibrated for a different element) respectively coupled to the division circuit output terminal 24 through corresponding function switches 30a, 30b, 30c, 30d. Such function generators are well known to the spectrochemical art and are preferably of the classic biased diode-resistor matrix style (available from Philbrick/Nexus Researches, a division of Teledyne, Inc.), though operational-amplifier circuits or servo-driven tapped or other nonlinear potentiometers can also be used. The function generator modifies the intensity-ratio signal in accordance with a calibration curve for each element under consideration to produce a signal which is linearly related to concentration ratio of that element to the reference element.

After each intensity-ratio signal is modified by the function generator means, the produced concentration ratio signal is applied to an analog data storage and summation means 32 through a storage switch 34. The storage and summation means 32 includes a plurality of signal storage devices, such as a first or reference storage capacitor 36a, a second storage capacitor 36b, a third storage capacitor 36c, and a fourth storage capacitor 36d, connected to the storage switch 34 through respective sequentially operable data switches 38a, 38b, 38c, 38d. For convenience, an auxiliary data switch 40 is provided between the first storage capacitor 36a and the storage switch 34, although the auxiliary data switch 40 is not required since its function can be performed by the first data switch 38a.

One side of each of the storage capacitors 36 is normally connected to common or ground, through respective double-throw switches 42a, 42b, 42c, 42d, which are simultaneously operable for connecting all of the storage capacitors 36 in series. It should be noted that both of the alternative configuration of the final double-throw switch 42d connects the final storage capacitor 36d to common. This final switch 42d is included for convenience and can be eliminated, in which case the final storage capacitor 36d is directly connected to common.

When the storage capacitors 36 are charged to the respective concentration ratio voltages, the integrator means 10 and the function generator means 26 are disconnected from the remainder of the system, by switching the double-throw switch 20 to the storage and summation means 32 and by opening the storage switch 34.

When the storage capacitors 36 are connected in series, the voltage across the storage capacitor combination is equal to the sum of the individually stored voltages, and from Equation (3), $$\Sigma(V_{CR})_i = K\Sigma(C_i/C_r). \quad (4)$$

The summation signal $\Sigma(V_{CR})_i$ is applied as a divisor to the division circuit 18, by closing the auxiliary data switch 40. After setting of the division circuit 18, the auxiliary data switch 40 is opened, and the storage capacitors 36 are disconnected from one another. The concentration ratio voltages across the storage capacitors 36 are thereupon sequentially applied as dividends to the division circuit 18, to produce output voltages $$(V_o)_i = k((V_{CR})_i / \Sigma(V_{CR})_i), \quad (5)$$

where $k$ is a constant having the dimension volts. Substituting Equations (3) and (4), $$(V_0)_i = k \frac{K \dfrac{C_i}{C_r}}{K\Sigma \dfrac{C_i}{C_r}}$$

and from Equation (2), $$(V_o)_i = kC_i. \quad (7)$$

The output voltages $(V_o)_i$ can be applied to suitable output means, for example an analog-to-digital converter 44 (which can be a digital voltmeter if visual output is desired in addition to an electrical output) for providing digital representations thereof. A variety of commercially available units (such as a Fairchild Model 7100A or Hewlett-Packard Model 3440A) are suitable for converter 44. The constant $k$ in equation (7) can be adjusted in conjunction with the full scale range of converter 44, so that the values printed by a digital printer 46 are visible indications of the element concentrations.

Since each concentration ratio is divided by the sum of all the concentration ratios, it is evident that the accuracy of the concentration calculations is dependent upon the extent to which all of the elements in the sample being analyzed are included in the computation. Neglecting elements in the computation will introduce an error in the value of the summation signal which will in turn introduce errors in the determination of the element concentrations. All significant elements must therefore be included for generating the summation signal, the term "significant" being used to indicate those elements required to produce a specified degree of accuracy for a particular analysis.

It should be pointed out that, since the ratio of the reference element concentration to itself is unity, the reference storage capacitor 36a can be replaced by a constant voltage source, such as a battery having a voltage K, where K is the constant in Equation (3).

In operation, the double-throw switch 20 and the storage switch 34 are preliminarily closed to the integrator means 10 and to the storage and summation means 32, respectively. All of the integrator switches 16, 22 the function switches 30, and the data switches 38, 40 are in their open configurations. The storage capacitors 36 are in a discharged condition, and are connected to common through their respective double-throw switches 42. When it is desired to calculate the element concentrations from the voltages across the integrator capacitors 12, the auxiliary reference integrator switch 22 is closed and the reference intensity voltage applied to the division circuit 18 as a divisor; the auxiliary switch 22 is thereupon opened.

The first integrator switch 16a, the first function switch 30a, and the first data switch 38a are closed simultaneously, and the concentration ratio voltage corresponding to the reference element is stored in the first storage capacitor 36a. The first data switch 38a is thereupon opened, and immediately thereafter both the first integrator switch 16a and the first function switch 30a are caused to open.

Similarly, correspondingly lettered switches in each of the three switch pluralities 16, 30, 38 are operated to store the concentration ratio voltages of the other elements in their corresponding storage capacitors 36. The reason that the data switches 38 are caused to open slightly before the integrator switches 16 and the function switches 30, is to assure that the voltages across the storage capacitors 36 are not altered when the integrator capacitors 12 are disconnected from the division circuit 18.

After the concentration ratio voltages of all of the significant elements and other elements of interest in the material being analyzed are stored in the storage capacitors 36, the double-throw switch 20 is switched to the storage and summation means 32, and the storage switch 34 is caused to open. The double-throw switches 42 are simultaneously switched from their grounded configurations to their alternative configurations, connecting the storage capacitors 36 in series. The auxiliary data switch 40 is closed, and the summation voltage signal is applied to the division circuit as a divisor, after which the auxiliary data switch 40 is opened.

The first data switch 38a is thereupon closed, and the first concentration ratio voltage is applied to the division circuit 18 as a dividend, producing a first output voltage signal at the divider output terminal 24, which represents the concentration of the reference element. The first output voltage signal is applied to the analog-to-digital converter 44, and a visible indication of the concentration is printed by the digital printer 46. The first data switch 38a thereupon opens.

Similarly, the remaining data switches 38b, 38c, 38d are operated sequentially for producing output signals at the divider output terminal 24 representing the concentrations of the other elements in the material being analyzed, and which are printed by the digital printer 46.

Figure 2:
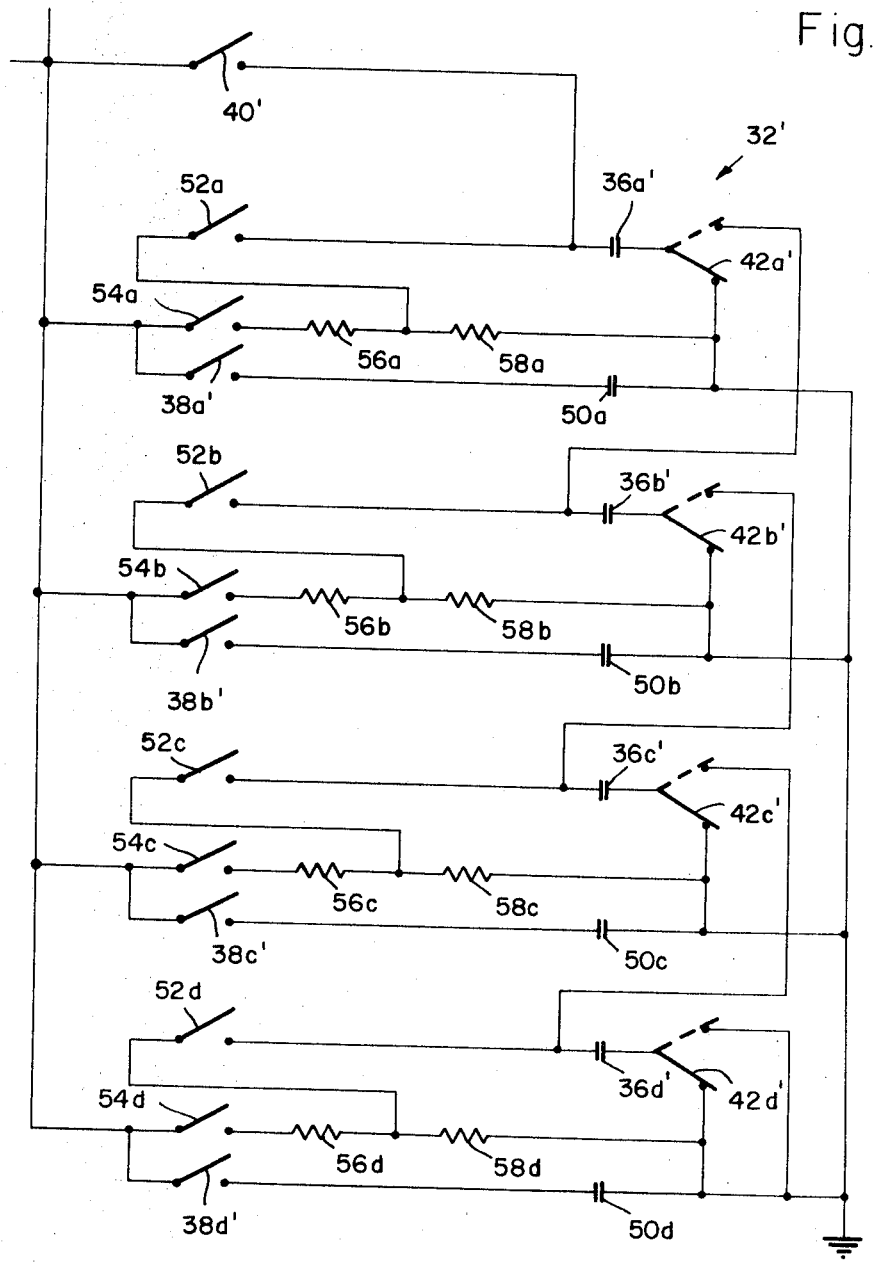
FIG. 2 is an alternative circuit configuration of the storage and summation means shown in the preferred embodiment of FIG. 1.

Turning next to FIG. 2, an alternative configuration of the storage and summation means 32' is shown, wherein primed reference numerals are utilized to indicate components corresponding to those of FIG. 1.

The alternative configuration of FIG. 2 is advantageously utilized where both high and low concentrations of elements are to be determined in the analysis of the material. In such cases, concentration ratios can differ by several orders of magnitude between elements of high and low concentrations. In satisfying the requirement that the constant $k$ be identical for all elements when the voltages $K(C_i/C_r)$ are summed, a high resolution measuring system with a wide dynamic range would be required when the individual voltages $K(C_i/C_r)$ are applied as dividends to the division circuit.

This situation is improved by means of the alternative configuration of FIG. 2, wherein two storage capacitors 36', 50 and three switches 38' 52, 54, are provided for each element. The storage capacitors 36' which are utilized to sum the voltages $K(C_i/C_r)$, are charged through voltage dividers comprising resistors 56, 58.

In accordance with the resolution of the measuring system, the storage capacitors 50 are charged to voltages sufficiently high to assure resolution for both high and low concentration elements. This can be accomplished by suitable adjustment of the phototube voltages, permitting the storage capacitors 50 to be charged to conveniently high values, for example to voltages $10K/C_i/C_r$), $100K(c_i/C_r)$, $1000K(C_i/C_r)$, etc. The values of the various resistors 56,58 comprising the voltage divider are selected to assure that the various storage capacitors 36' are respectively charged to voltages $K(C_i/C_r)$.

The switches 38', 52, 54 are normally open, and individual pairs of storage capacitors (for example, the reference storage capacitors 36a', 50a) are caused to charge when the corresponding concentration ratio voltage is applied thereto through the corresponding switches (for example, switches 38a', 52a, 54); these switches are thereupon opened.

When it is desired to generate the summation signal, all the double-throw switches 42' are switched to connect the storage capacitor 36' for each element in series. The auxiliary data switch 40' is thereupon closed to apply the summation signal as a divisor to the division circuit.

The individual concentration ratio signals, stored in the storage capacitors 50 for each element, are thereupon applied as dividends to the division circuit, upon sequential operation of the various data switches 38'.

For those elements whose storage capacitors 50 have been charged to voltages $10K(C_i/C_r)$, $100K(C_i/C_r)$, $1000K(C_i/C_r)$, etc., the concentrations $C_i$ which are read out will have the correct numerical value but will require relocation of the decimal point (depending upon the increased order of magnitude of charging of the particular storage capacitor 50).

It should be noted that the alternative configuration of FIG. 2 can be further utilized in cases where the division circuit requires the voltages corresponding to both divisor and dividend to be applied simultaneously. In such cases, the data switches 38' are not connected to the auxiliary data switch 40', so that the summation voltage can be applied to the division circuit simultaneously with each of the concentration ratio voltages.

Thus, there has been described a preferred embodiment, and an alternative configuration thereof, of apparatus for automatically determining the concentration of elements in a material subjected to spectrochemical analysis, together with an analog method for utilizing the apparatus.

Modifications of the method disclosed, and of the embodiments herein presented, may be developed without departing from the essential characteristics thereof. For example, although storage capacitors would appear to be the most economical storage devices, alternative storage devices (such as servo driven potentiometers) can be utilized.

Accordingly, the invention should be limited only by the scope of the claims listed below.

What I claim is:

1. An analog method for calculating concentrations of elements in a material subjected to spectrochemical analysis from analog electrical ratio signals representing the ratios of the concentrations of each of the elements to a particular one of the elements, by utilizing a division means and a plurality of analog storage means adapted to receive the ratio signals, comprising the steps of:
    1. storing the ratio signals in analog form in respective ones of said storage means;
    2. interconnecting said respective storage means to produce an analog summation signal representing the sum of the ratio signals corresponding to significant elements;
    3. applying said summation signal as a divisor to said division means;
    4. disconnecting said storage means from one another to permit delivery of individual ratio signals;
    5. applying one of said stored analog ratio signals as a dividend to said division means to produce an output signal representing a quotient of said one ratio signal to said summation signal.

2. An analog method for calculating concentrations of elements in a material subjected to spectrochemical analysis from analog electrical ratio signals representing the ratios of the concentrations of each of the elements to a particular one of the elements, by utilizing a division means and a plurality of analog storage means adapted to receive the ratio signals, comprising the steps of:
    1. storing each of the ratio signals in analog form in respective ones of said storage means;
    2. interconnecting said storage means in series to produce an analog summation signal representing the sum of the ratio signals corresponding to significant elements;
    3. applying said summation signal as a divisor to said division means;
    4. disconnecting said storage means from one another to permit delivery of individual ratio signals; and
    5. applying said stored analog ratio signals individually as dividends to said division means to produce output signals respectively representing quotients of said ratio signals to said summation signal.

3. An analog method for calculating concentrations of elements in a material subjected to spectral-radiation analysis producing analog electrical signals corresponding to intensities of respective element components of the radiation, comprising the steps of:
    1. generating a first analog ratio signal representing the ratio of a first one of said electrical signals to a particular one of said electrical signals;
    2. modifying said first ratio signal to produce a first modified analog ratio signal representing a ratio of the concentrations of a first one of the elements to a particular one of the elements;
    3. storing said first modified ratio signal in analog form;
    4. sequentially repeating Steps (1), (2) and (3) for each of the others of said electrical signals, for producing and storing modified analog ratio signals respectively corresponding to concentration ratios of each of the other elements to said particular one;
    5. generating a summation signal from said stored modified analog ratio signals, said summation signal representing the sum of the stored modified ratio signals corresponding to significant elements; and
    6. generating output signals from said summation signal and said stored modified analog ratio signals, said output signals respectively representing quotients of said stored modified ratio signals to said summation signal.

4. An analog method for calculating concentrations of elements in a material subjected to spectral-radiation analysis producing analog electrical signals corresponding to intensities of respective element components of the radiation, comprising the steps of:
    1. generating a first analog ratio signal representing the ratio of a first one of said electrical signals to a particular one of said electrical signals;
    2. modifying said first ratio signals to produce a first modified analog ratio signal representing the ratio of the concentrations of a first one of the elements to a particular one of the elements;
    3. storing said first modified ratio signal in analog form;
    4. sequentially repeating Steps (1), (2) and (3) for each of the others of said electrical signals, for producing and storing modified analog ratio signals respectively corresponding to concentration ratios of each of the other elements to said particular one;
    5. generating a summation signal from said stored modified analog ratio signals, said summation signal representing the sum of the stored modified ratio signals corresponding to significant elements; stored modified
    6. generating a first output signal from said summation signal and said first modified analog ratio signal, said first output signal representing the quotient of said first stored modified ratio signal to said summation signal; and
    7. sequentially repeating Step (6) for generating output signals from said summation signal and the others of said stored modified analog ratio signals, said output signals respectively representing quotients of said others to said summation signal.

5. In combination with a spectrometer for the analysis of radiation characteristic of a material, including signal generating means for generating a plurality of electrical analog ratio signals representing the ratios of the concentrations of each element in the material to a particular one of the elements, apparatus for determining the concentrations of the elements, comprising the combination of:
    a plurality of analog storage means for separately storing said ratio signals;
    first connecting means for interconnecting said storage means to generate a summation signal representing the sum of the analog ratio signals corresponding to significant elements;
    division means for generating output signals representing quotients of each of said analog ratio signals to said summation signal when said summation signal is applied thereto as a divisor and said ratio signals are individually applied thereto as dividends; and
    second connecting means connected from the plurality of storage means to the signal-generating means and division means for selectively applying the analog ratio signals to the storage means and the summation signal and stored analog ratio signals to the division means.

6. The apparatus according to claim 5, above, wherein each of said storage means of said plurality includes a storage capacitor, and said first connecting means is arranged to interconnect said capacitors in series to generate said summation signal.

7. The apparatus according to claim 5 in which the second connecting means includes switching means coupling said storage means and said division means for applying said summation signal to said division means as a divisor and for sequentially applying said ratio signals to said division means as dividends.

8. The apparatus according to claim 7 wherein each of said storage means of said plurality includes a storage capacitor, and said first connecting means is arranged to interconnect said capacitors in series to generate said summation signal.

9. The apparatus according to claim 7, above, further including analog-to-digital converter means coupled to said division means for producing digital representations of said output signals.

10. The apparatus according to claim 9, above, further including digital printer means coupled to analog-to-digital converter means for producing visible indications of said digital representations.

11. In combination with a spectrometer for the analysis of radiation characteristic of a material, including signal generating means for generating a plurality of electrical ratio signals representing the ratios of the concentrations of each element in the material to a particular one of the elements, apparatus for determining the concentrations of the elements, comprising the combination of:
   a first plurality of storage means for separately storing first signals proportional to said ratio signals;
   a second plurality of storage means for separately storing second signals corresponding to said ratio signals;
   first connecting means for interconnecting the storage means of said first plurality to generate a summation signal representing the sum of the first signals corresponding to significant elements;
   division means for generating output signals representing quotients of each of said second signals to said summation signal when said summation signal is applied thereto as a divisor and said second signal are sequentially applied thereto as dividends; and
   second connecting means connected from the first and second pluralities of storage means to the signal-generating means and division means for selectively applying the ratio signals to the first and second pluralities of storage means, and the summation signal and stored second signals to the division means.

12. The apparatus according to claim 11, above, wherein:
   each of said storage means of said first plurality includes a storage capacitor;
   each of said storage means of said second plurality includes a storage capacitor; and
   the first connecting means is arranged to interconnect the capacitors of said first plurality in series to generate said summation signal.

13. The apparatus according to claim 12 in which the second connecting means includes switching means coupling said storage means and said division means for applying said summation signal to said division means as a divisor and for sequentially applying said second signals to said division means as dividends.

14. In a spectrometer for the analysis of radiation characteristic of a material, including signal generating means for generating a plurality of electrical signals corresponding to intensities of spectral components of the radiation, apparatus for determining the concentrations of elements in the material, comprising the combination of:
   division means adapted to receive said electrical signals and arranged to generate intensity-ratio signals representing the ratios of each of said electrical signals to a particular one of said electrical signals;
   function generator means selectively connectable to the division means for modifying each of the intensity-ratio signals to produce concentration-ratio signals representing the ratios of the concentrations of each of the elements to a particular element corresponding to said particular one of said electrical signals;
   storage means selectively connectable to the function-generator means to receive and individually store the concentration-ratio signals;
   the storage means including summing means for selectively generating a summation signal representing the sum of the concentration-ratio signals corresponding to significant elements; and
   connecting means selectively connectable between the division means and the signal-generating means and storage means for applying the electrical signals to the division means to generate the intensity-ratio signals, and for applying the summation signal and the concentration-ratio signals to said division means to generate output signals representing quotients of each of the concentration-ratio signals to said summation signal.

15. The apparatus according to claim 14, above, further including indicator means coupled to said division means for producing visible indications of said output signals.

16. The apparatus according to claim 14, above, further including analog-to-digital converter means coupled to said division means for producing digital representations of said output signals.

17. The apparatus according to claim 16, above, further including digital printer means for printing visible indications of said digital representations.

PO-1050
(5/69)

UNITED STATES PATENT OFFICE
CERTIFICATE OF CORRECTION

Patent No. 3,600,567                              Dated   August 17, 1971

Inventor(s)  Veijo V. Varnela

It is certified that error appears in the above-identified patent and that said Letters Patent are hereby corrected as shown below:

Cover sheet, "Ind." should read -- Inc. --.

Column 5, between lines 7 and 15 and after and spaced to the right of the equation, insert --  (6) --.

Column 6, line 51, "10K/$C_i$/$C_r$) should read -- 10K($C_i$/$C_r$); 100K($c_i$/$C_r$)" should read -- 100K($C_i$/$C_r$) --.

Column 8, line 37, delete "stored modified".

Column 9, line 38, "signal" should read --signals--.

Signed and sealed this 4th day of April 1972.

(SEAL)
Attest:

EDWARD M. FLETCHER, JR.                    ROBERT GOTTSCHALK
Attesting Officer                          Commissioner of Patents